United States Patent
Yach et al.

(10) Patent No.: US 7,853,245 B2
(45) Date of Patent: Dec. 14, 2010

(54) SYSTEM AND METHODS FOR WIRELESS MESSAGING

(75) Inventors: David P. Yach, Waterloo (CA); Gary P. Mousseau, Waterloo (CA); David Clark, Kitchener (CA); Scotte Zinn, Waterloo (CA); Michael Hardy, Waterloo (CA); Nataliya Martsyna, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 950 days.

(21) Appl. No.: 11/303,800

(22) Filed: Dec. 16, 2005

(65) Prior Publication Data

US 2007/0106740 A1 May 10, 2007

Related U.S. Application Data

(60) Provisional application No. 60/734,390, filed on Nov. 8, 2005.

(51) Int. Cl.
*H04L 12/58* (2006.01)
*H04M 1/725* (2006.01)
*G06F 15/16* (2006.01)

(52) U.S. Cl. .................................. 455/414.2; 709/206

(58) Field of Classification Search ................. 455/456, 455/466, 415, 566, 414.1, 412.1, 412.2, 445, 455/413, 419, 550.1, 442, 59, 61, 70, 72; 709/206, 207, 229, 228, 238; 370/335, 338
See application file for complete search history.

(56) References Cited

U.S. PATENT DOCUMENTS

| | | | |
|---|---|---|---|
| 7,574,203 B2 * | 8/2009 | Laumen et al. | 455/412.1 |
| 2003/0036380 A1 * | 2/2003 | Skidmore | 455/414 |
| 2004/0043762 A1 * | 3/2004 | Kim et al. | 455/418 |
| 2004/0133640 A1 * | 7/2004 | Yeager et al. | 709/204 |
| 2006/0116138 A1 * | 6/2006 | Simsek et al. | 455/466 |
| 2006/0224750 A1 | 10/2006 | Davies et al. | |
| 2006/0293032 A1 * | 12/2006 | Clarke et al. | 455/412.2 |
| 2007/0072588 A1 * | 3/2007 | Gorty et al. | 455/412.1 |
| 2007/0106739 A1 | 5/2007 | Clark et al. | |

OTHER PUBLICATIONS

Office Action for U.S. Appl. No. 11/303,429, filed Dec. 16, 2005.

* cited by examiner

*Primary Examiner*—Melody Mehrpour
(74) *Attorney, Agent, or Firm*—John J. Oskorep, Esq.

(57) ABSTRACT

Systems and methods for enabling data messaging in a wireless communications system is provided in one embodiment. Wireless messaging is enabled by having a host service send enable messages to a mobile communications device. Once an enable message has been received at the mobile communications device, the generation of an event causes the mobile communications device to send a fetch message to the host service to retrieve messages.

23 Claims, 4 Drawing Sheets

SYSTEM AND METHODS FOR WIRELESS MESSAGING

CROSS-REFERENCE TO RELATED APPLICATION(S)

This patent application is related to the subject matter disclosed in the following commonly owned provisional application: "SYSTEM AND METHODS FOR WIRELESS MESSAGING," filed 8 Nov. 2005, Application No. 60/734,390 (RIM No. 30569-ID) in the name(s) of: David Yach, Gary Mousseau, David Clark, Scotte Zinn, Michael Hardy and Nataliya Martsyna; all of which is incorporated by reference herein.

TECHNICAL FIELD

This application relates to wireless communication techniques in general, and systems and methods for wireless messaging in particular.

BACKGROUND

Mobile communications devices are becoming increasingly feature rich. The amount of power required to operate these feature rich devices might steer a manufacturer towards large devices, with large batteries. However, consumers typically choose smaller devices over larger ones and so it becomes a challenge for manufacturers to create the smallest device possible with as long a battery life as possible. Mobile communications devices contain radios which enable communication with a variety of external parties. The use of the radio is usually the mobile communications device's most power consuming operation.

In mobile communications devices one of the more popular applications is wireless messaging. Wireless messaging involves communicating with external parties, often a host service or message provider, to send and receive messages.

One method for retrieving messages has the mobile communications device poll the message provider (or host service) on a regular basis to ask for any pending messages. This method of wireless messaging consumes more power than required because of cases where polling is done when no messages are pending. Since there are no messages pending at the message provider, the poll accomplishes nothing. The extra use of the radio required to send superfluous poll messages to the host service is an unnecessary drain on the battery.

Another method for retrieving messages has the mobile communications device receive a notification message from the message provider (or host service) over a voice communication channel as an SMS (short message service) message and then the mobile communications device retrieves messages from the message provider (host service) using a data channel. This method requires cooperation between the voice and data processors and can lead to design issues and performance degradation. In addition, the use of SMS messaging may also limit the notification message's size, as SMS message's are usually limited to 160 characters in length.

BRIEF DESCRIPTION OF THE DRAWINGS

A better understanding of the present invention will be obtained by considering the detailed description below, with reference to the following drawings.

DETAILED DESCRIPTION OF THE DRAWINGS

Figure 1:
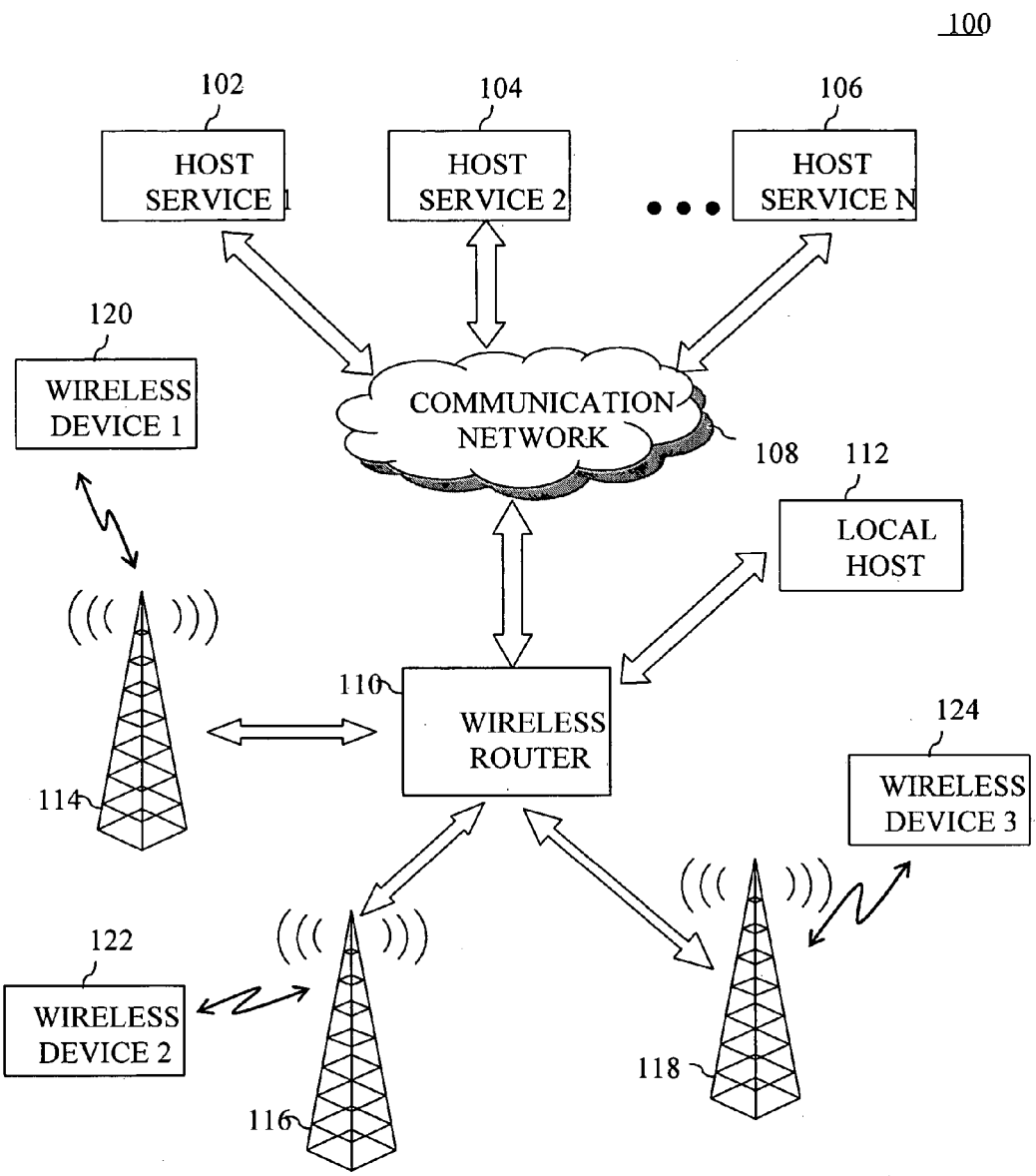
FIG. 1 is an exemplary environment in which a wireless communication system and method in accordance with a preferred embodiment may be practiced.

The present invention will now be described with reference to various examples of how embodiments can be made and used. Like reference numerals are used throughout the description and drawings to indicate like or corresponding parts, wherein the various elements are not necessarily drawn to scale.

One embodiment discloses a method for wireless messaging, the method comprising receiving an enable message using a communication channel generating an event, the event being independent of said receiving of said enable message and in response to said event, requesting a data message by sending a fetch message using the communication channel.

Another embodiment discloses a method for wireless messaging, the method comprising providing at least one data message upon said providing of said at least one data message, sending an enable message using a communication channel receiving a fetch message in response to the enable message using the communication channel and in response to said fetch message, sending the at least one data message using the communication channel.

In yet another embodiment, is disclosed a mobile communications device adapted for wireless messaging over a communication channel, the mobile communications device comprising a communication module adapted to receive an enable message transmitted over the communication channel and an event generator adapted to generate an event independently of the enable message received wherein the communications module is further adapted to send, in response to the event generated, a fetch request over the communication channel.

In yet another embodiment is disclosed a host service adapted for wireless messaging over a communication channel, the host service comprising a messaging module adapted to provide at least one data message and to send an enable message over the communication channel in response to the at least one data message provided wherein the messaging module is further adapted to receive, in response to the enable message sent, a fetch message over the communication channel and to send the at least one data message over the communication channel in response to the fetch message received.

FIG. 1 is an exemplary environment in which a wireless communication system 100 in accordance with a preferred embodiment may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. In this particular example, the host services 102, 104, and 106 are typically configured as servers, each containing at least one processor, a storage means and each using a network interface over which communications with a communication network 108 such as the Internet can be effectuated. The host services 102, 104 and 106 send and receive messages over communications network 108 to and from wireless router system 110 allowing communication between the host services 102, 104, and 106 and the wireless router system 110.

The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, such as a global system for mobile communication (GSM) network, or a code division multiple access (CDMA) network, a two-way paging network, a short range wireless network such as Bluetooth™ and IEEE 802.11 compliant network, and others alike, and the mobile devices 120, 122, and 124 are devices compatible with the corresponding wireless network.

Mobile communications devices 120, 122 and 124 are two-way communication devices with advanced data communication capabilities having the capability to communicate with other mobile devices or computer systems, such as host services 102, 104, 106, through a network of transceiver stations, including wireless router 111 and communication network 108. The mobile communication devices 120, 122 and 124 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practised with any type of mobile device, whether listed above or not. In the example shown in FIG. 1, mobile communications devices 120, 122 and 124 each contain a processor, a radio, an information storage means and at least one software module adapted to perform tasks. In a preferred embodiment, mobile communications devices 120, 122 and 124 are capable of sending and receiving messages using the radio. Also in the preferred embodiment, the at least one software module includes an event generator module, adapted to generate events, and a communications module, adapted to send and receive messages using the MCD's radio.

Mobile communications devices are generally capable of communicating over multiple communication channels. For example, SMS messages arrive over the voice communication channel, whereas email messages arrive over a data communication channel. As explained above, the MCD 120 includes modules, software for example, which are adapted to perform various tasks when executed in MCD 102's processor. In one embodiment, the MCD 120 contains both a communication module and an event generator module. The communication module is adapted to execute in MCD 120's processor and in cooperation with the MCD 120's radio is capable of sending and receiving messages. The event generator module is also adapted to execute in MCD 120's processor and is capable of generating events in one of two ways: user generated events and device generated events. User generated events include such things as the user of MCD 120 opening a messaging application resident in MCD 120, such as an email application, the user of MCD 120 rolling a wheel input device, such as a thumbwheel, the user of MCD 120 pressing a key on MCD 120's keyboard, the user of MCD 120 logging in to MCD 120 or the user of MCD 120 electing to maintain an session active by responding to a prompt from MCD 120. Device generated events include such things as the expiry of a timer, MCD 120 generating a ping message to keep a session alive with the network or MCD 120 commencing a data session, such as a PDP context, with a network.

One of the primary purposes of host services 102, 104 and 106 is to process information received from other sources, such as mail servers (not shown) and mobile communications devices 120, 122, 124, and send the information on to the appropriate recipient, typically a different host service 102, 104, 106, mail server or mobile communications device 120, 122 or 124. Host services 102, 104 and 106 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 102, 104 and 106 also contain a software module, which executes in their processor to achieve the desired sending and receiving of messages as well as the appropriate processing of information. In a preferred embodiment the software module of each host service 102, 104, 106 is a messaging module, the messaging module is adapted to receive messages from at least one external mail server, send messages to mobile communications devices 120, 122, 124, receive messages from the same mobile communications devices and send messages to the at least one external mail server(s). The at least one external mail server(s) could also be at least one mobile data server(s) for example. The wireless router system 110 may also be directly connected to a host service, such as a local service 112, without the communication network 108. In another embodiment, it is possible for host services 102, 104 and 106 to communicate directly with mobile communications devices 120, 122 and 124, in this embodiment, host services 102, 104 and 106 must be capable of addressing communications to mobile communications devices 120, 122 and 124 without the aid of the wireless router system 110.

In the environment described in FIG. 1, messaging occurs between mobile communications devices 120, 122 and 124 and host services 102, 104 and 106. It is possible for mobile communications devices 120, 122 and 124 to send messages to and receive messages from host services 102, 104 and 106. As an example, when a message is received by any one of host services 102, 104, 106, the intended recipient, mobile communications devices 120, 122 and 124 is informed by the host service 102, 104 and 106 that a message has arrived which needs to be retrieved by way of an enable message. Host service 102, 104 and 106 may send a plurality of enable messages to mobile communications device 120, 122 and 124 or host service 102, 104 and 106 may choose to send one enable message until mobile communications device 120, 122 and 124 fetches the pending message(s). A fetch command is issued by the mobile communications device 120, 122 and 124 upon the generation of an event by an event generator after an enable message has been received and is sent to host service 102, 104 and 106. The generated event and the enable message are independent and neither one influences the occurrence or likelihood of the other. When host service 102, 104 and 106 receives a fetch command, host services 102, 104 and 106 will send the pending message or messages to mobile communications device 120, 122 and 124 which issued the fetch command. Both the enable messages and the fetch message may or may not contain message identifiers. A message identifier uniquely identifies a message for mobile communications devices 120, 122 and 124 and allows mobile communications devices 120, 122 and 124 to retrieve specific messages. The host service 102, 104, 106 may send all pending messages should multiple messages be pending for the mobile communications device 120, 122 and 124 which issued the fetch command.

Figure 2:
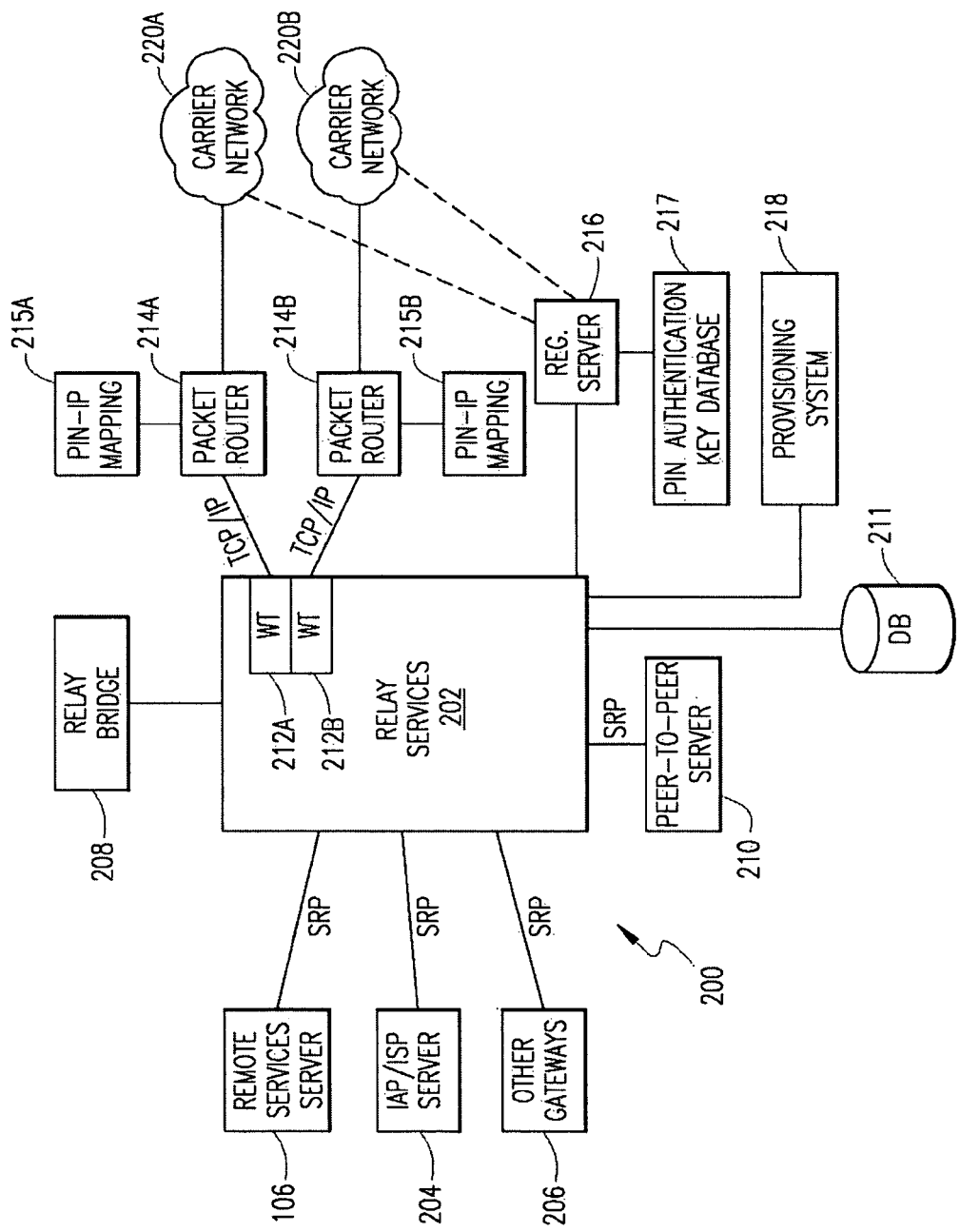
FIG. 2 depicts additional details of an exemplary relay network infrastructure operable as part of the wireless router system of FIG. 1.

FIG. 2 depicts additional details of an exemplary relay network infrastructure 200 operable as part of wireless router system 110 (from FIG. 1) described above. A relay services node 202 is operable, at least in part, for providing connectivity between mobile communication devices 120, 122, 124 and various data application services (host services 106, Internet Access Provider/Internet Service Provider server 204, peer-to-peer server 210 and other gateways 206 for example), regardless of the geographic location of the mobile communications devices 120, 122, 124 and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which mobile communication device messages can flow to and from host services 102, 104, 106, irrespective of the region where the mobile communications device 120, 122, 124 is in.

Communication between the relay services node 202 and various application gateways and servers is effectuated using any suitable protocol, e.g., Server Relay Protocol (SRP), preferably over Internet Protocol (IP) links. By way of illustration, host service 102 (from FIG. 1) associated with the communication network 108 (from FIG. 1) sends information to and receives information from relay services node 202 using SRP. Relay services node 202 in turn sends information to and receives information from mobile communications devices 120, 122 and 124. Likewise, reference numerals 204 and 206 refer to external application gateways, such as Internet Service Provider (ISP) or Internet Access Provider (IAP) servers, and other gateways, respectively, which are also interfaced with the relay services node 202 using SRP. A peer-to-peer server 210 may also be provided in operable connection with the relay services node 202 for handling peer-level messaging between two mobile communication devices 120, 122, 124 using their respective PIN indicia.

Additionally, a database 211 may be provided in operable connection with the relay services node 202 for handling and managing mobile communication device location and capability information. Preferably, this location and capability information is stored in records by PIN indicia of the mobile communication devices 120, 122, 124, which may be programmed into the devices at the time of manufacture or dynamically assigned afterwards, wherein the stored records maintain a particular device's last known location and capabilities. A registration server 216 is operable for providing registration services for mobile communication devices 120, 122, 124 when they are initially activated or when the user re-registers due to moving to a different wireless network coverage area. In one implementation, the address information of registration server 216 may be programmed into the mobile communication devices 120, 122, 124 to locate, contact and register with registration server 216. When a mobile communications device 120, 122, 124 registers successfully, registration server 216 is operable to provide relay services node 202's location, whereupon data sessions may be engaged by the mobile communications device 120, 122, 124. Further, a database 217 is associated with the registration server 216 for storing a PIN authentication key provided by the mobile communication device during its registration with the network. The PIN authentication key may be used by the network in securing the PIN indicium of a mobile communication device 120, 122, 124 so that it can be ensured that packets are delivered to or received from a legitimate mobile communication device (i.e., with a valid PIN) instead of a device that has illegally accessed or stolen a PIN or managed to impersonate, or spoof, a PIN.

One or more wireless transport (WT) interfaces are provided as part of relay services node 202 for connecting with the wireless carrier networks that service mobile communication devices 120, 122, 124. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B.

Continuing to refer to FIG. 2, registration server 216, which handles administration and registration services for mobile communication devices 120, 122, 124, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, mobile communication device manufacturers, resellers, and other entities in order to support any number of service and market differentiation requirements. Additionally, the provisioning system 218 may include logic for provisioning personalized indicia (e.g., PIN assignment and management) with respect to the mobile communication devices 120, 122, 124. Also, subscriber validation logic may be provided as part of the provisioning system 218. PRV 218 and relay services node 202 may additionally include logic and storage means intended to track the current state of individual or groups of mobile communication devices 120, 122, 124 as well as the current state of individual or groups of host services 102, 104 and 106. The current state information to be stored, preferably in a cache or database 211, may include such information as location, capabilities and mask values. In a preferred embodiment, mobile communications devices 120, 122 and 124 report their location and capabilities to registration server 216 which passes the information on the relay services node 202. Also in a preferred embodiment, host services 102, 104 and 106 report their location and capabilities directly to relay services node 202. In a preferred embodiment, the mask values (masks) are determined by relay services node 202 and are based on the received location and capabilities data. These masks are stored in association with an identification of the originator of the information and are used to determine the originator's accessibility to certain services, including but not limited to email service and any other data service. Using the masks, relay services 202 can decide whether to pass on a communication received from a given mobile communications device 120, 122, 124 or drop the communication and send a negative acknowledgment to the sender. Current state information, such as location, capabilities and masks, could be updated by, for example, communication with registration server 216, communication with a mobile communication device 120, 122, 124 or communication with host services 102, 104, 106. In another embodiment, the current state information could be stored at WT 212A and 212B.

Figure 3:
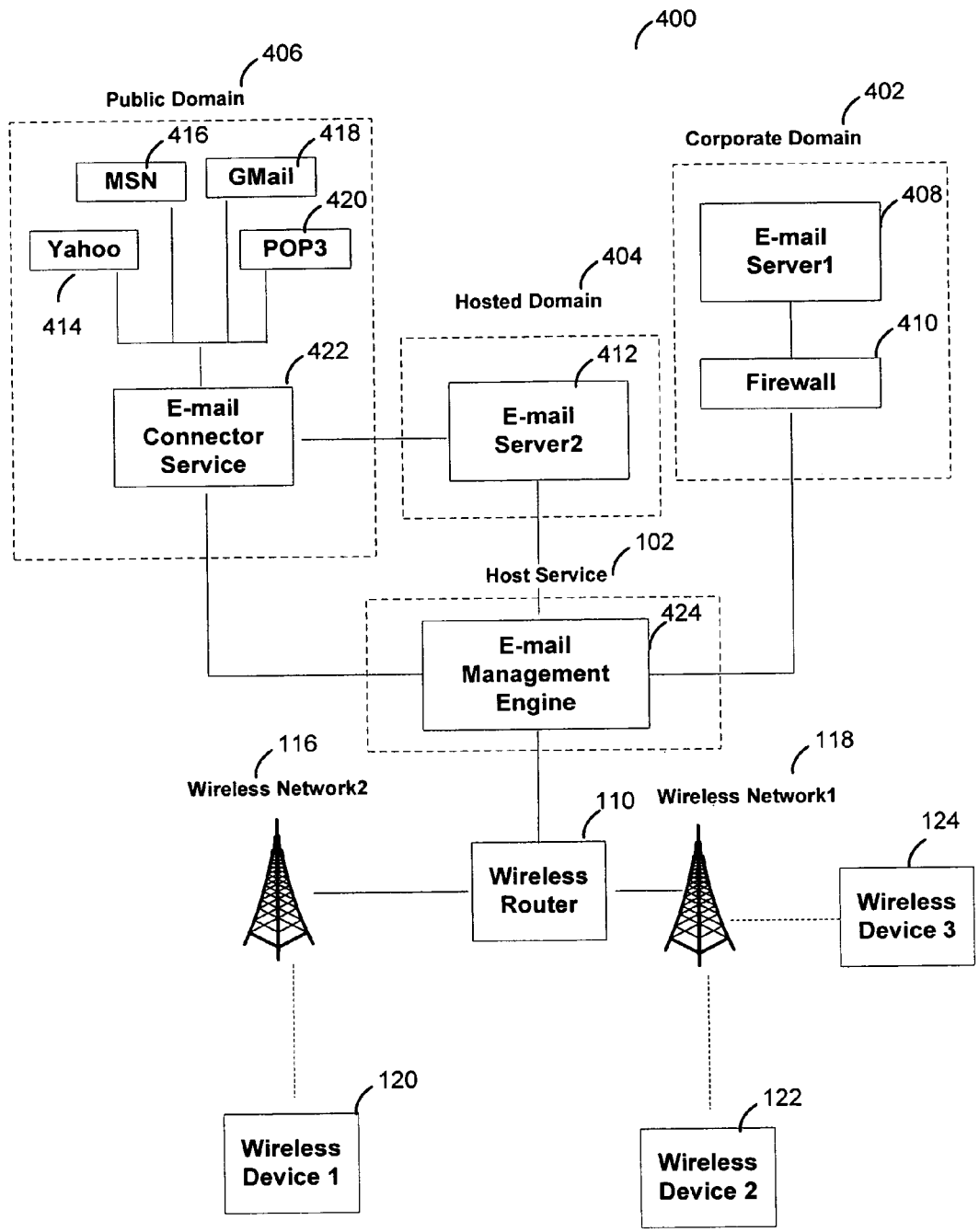
FIG. 3 is an exemplary illustration of a wireless communication system for message delivery from a plurality of e-mail servers to a plurality of mobile devices according to another preferred embodiment.

FIG. 3 is an exemplary environment in which a wireless communication system 400 in accordance with another preferred embodiment may be practiced. Wireless communication system 400 comprises a plurality of e-mail servers from different domains; a corporate domain 402, a hosted domain 404 and a public domain 406.

Corporate domain 402 is used to categorize the messaging system for any corporation, organization or private network.

Corporate domain 402 includes enterprise E-mail Server 408 and firewall 410. Examples of corporate e-mail servers include Microsoft Exchange Server™, Lotus Notes™ and Novell Groupwise™.

Hosted domain 404 is used to categorize messaging systems hosted by wireless carriers, Internet Service Providers (ISPs) and/or Application Service Providers (ASPs). Within the hosted domain 404 is included E-mail Server2 412 that stores and manages e-mail messages. Some examples of hosted domains include AOL, Verizon, Earthlink or Cingular messaging services.

Public domain 406 is used to categorize messaging systems that provide free (or almost free) e-mail messaging services to the public. These e-mail systems may include Yahoo Mail™ 414, Microsoft MSN™ 416, Google GMail™ 418, and/or other POP3 related mail systems 420. These mail systems all connect to an e-mail connector service 422 that consolidates different mail systems and protocols to communicate with a wireless host service 402. E-mail connector service 422 may be integrated into each respective mail system (414, 416, 418 or 420) or it may on a separate server.

In some instances, email servers from hosted domains 412 may redirect or "piggyback" off public domain messaging systems and use their infrastructure and back office to manage e-mail message delivery. For example, wireless carrier A may outsource the e-mail service management to Yahoo so their customers may receive Yahoo Mail™ branded as a service for carrier A.

Email servers from corporate domain 402, hosted domain 404 and public domain 406 all connect to a host service 102. In this specific embodiment, host service 102 is e-mail management engine 424. E-mail management engine 424 is responsible for managing the retrieval, delivery and conversion of e-mail messages from a networked world to various wireless networks 116 and 118. E-mail management engine 424 may manage protocol conversion from Internet-based TCP/IP, SMTP, IMAP, POP3 or MIME-based message and delivery protocols to more compact, efficient and/or secure wireless protocols such as CMIME, and UDP.

Once a message arrives at e-mail management engine 424, it is forwarded to wireless router 110 which redirects the message to the appropriate wireless networks 116 or 118, to deliver the message to the respective mobile devices 120, 122 or 124.

Each mobile device (120, 122, or 124 respectively) may be associated to one or more e-mail accounts from a corporate, hosted or public domain (402, 404, or 406 respectively). The management of account mapping is also controlled and stored by e-mail management engine 424. E-mail management engine 424 may also have alert, temporary message storage and message forwarding capabilities.

E-mail management engine 424 is the hub that connects to various email servers (408, 412, 414, 416, 418, 420), services (422) and one or more wireless routers (110) across the Internet using known TCP/IP-based protocols, leased lines (e.g., X.25 connections) and/or virtual private network (VPN) connections. Other secure Internet based connections may also exist. Wireless router 110 may also use the same or similar connection options to connect to multiple wireless networks 116 and 118 respectively.

In addition to e-mail messages, communication system 400 may also provide other services, such as telephony communications, paging, instant messages, Internet access, and other various data services to mobile devices 120, 122 and 124.

Figure 4:
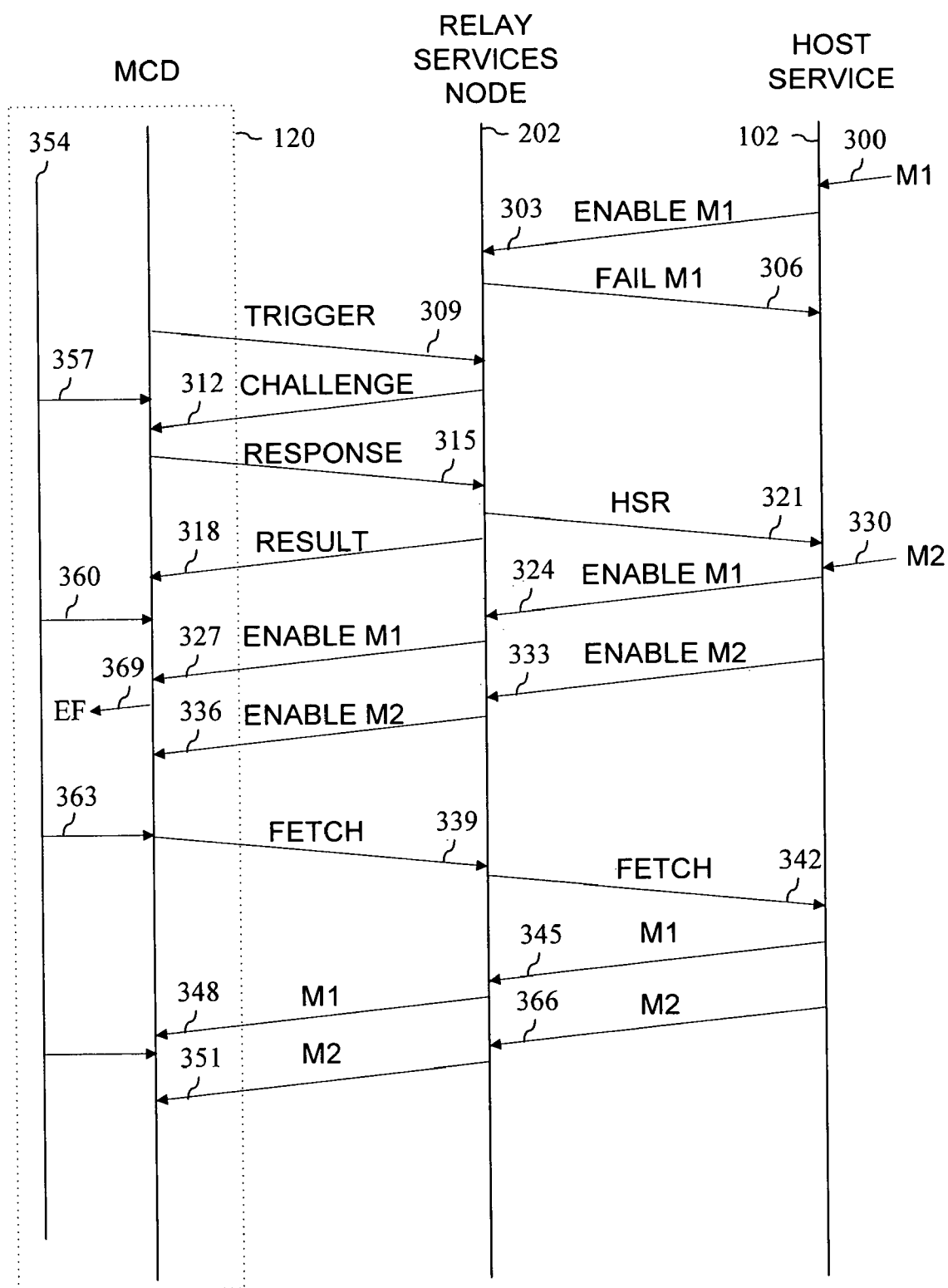
FIG. 4 is a communications sequence diagram describing an exemplary system and method for wireless messaging between a host service and a mobile communications device of FIG. 1.

Reference is now made to FIG. 4 where there is shown an exemplary embodiment of how a message delivery session between mobile communications devices 120, 122, 124, relay services 202 and host services 102, 104, 106 may be carried out to deliver messages from a host service 102, 104, 106 to a mobile communications device 120, 122, 124. Before describing the message flow shown in FIG. 4, a detailed description of the participants and the individual messages themselves will be provided.

Labelled participants in this flow diagram are: the mobile communications device (MCD) 120 (which could also be any of wireless communications devices 122 and 124), relay services node 202 and host services 102 (which could also be any of host services 104 and 106). In this particular example, the message delivery session shows the delivery of two messages, M1 and M2, received at the host service and delivered to the mobile communications device. It should be understood that this conversation could occur between more than one of each of the participants and could involve any number of messages intended for any number of mobile communications devices. It is also understood that although messages M1 and M2 are preferably email, they could be any other type of data message such as for example web browser or calendar synchronization messages.

Along the left side of FIG. 4 is event generator 354 of MCD 120. In one embodiment, event generator 354 generates an event following a given time interval. In a preferred embodiment, the events are generated at a uniform interval, 1 min for example, but it is possible in other embodiments that events are generated at non-uniform intervals. Non-uniform intervals could be generated using a back off algorithm or a random timing pattern for example. It is also to be understood that in another embodiment, event generator 354 could generate events based on a user's interaction with MCD 120. User interaction could for example include removing MCD 120 from a holster, pushing a designated button, entering a predetermined key sequence (such as Ctrl-R for example) or selecting an item on the MCD's display (selecting an item from a menu for example).

Communications 300 and 330 represent the provision of messages M1, M2, at host service 102. Providing messages M1, M2 to host service 102 is defined as host service 102 receiving a notification regarding message M1, M2 or as host service 102 receiving messages M1, M2. As noted above one of the primary purposes of the host services 102 is to process information received from other sources, such as mail servers and mobile communications devices, and send it on to the appropriate recipient, typically a different mail server or mobile communications device. In FIG. 4, the host service 102 is operable to receive messages (such as M1 and M2 for example) from an external service and through relay services node 202, deliver received messages to the intended recipient MCD 120.

Communications 309, 312, 315 and 318 are all setup messages which establish MCD 120's presence with the relay services node 202 so that the relay services node 202 can be aware of the MCD 120's address. During communications 309, 312, 315 and 318, information is exchanged such as MCD 120's location and capabilities, and a shared key is also exchanged. Before communications 309, 312, 315 and 318 have been completed, the relay services node 202 is unaware of MCD 120 and therefore cannot deliver messages to it. After communications 309, 312, 315 and 318, the relay services node 202 becomes aware of, and able to communicate with MCD 120 device and it will notify relevant host services in communications such as communication 321. Relevant host services may include any of host services 102, 104 or 106 which have indicated an interest in communicating with MCD 120. Communication 321 serves to notify a particular host service (102 in this example) that MCD 120 is live and that host service (102 in this example) may communicate with MCD 120 if it desires.

Communications 309, 312, 315 and 318 are not a necessary element of the present embodiment, but are used to illustrate the behaviour which would be exhibited when relay services node 202 is unaware of the presence of MCD 120. In particular, it should be noted that relay services node 202 does not queue messages intended for MCD 120 whose presence is not currently known to relay services node 202. One advantage of not queuing messages at relay services node 202 is realised when it is noted that many host services 102, 104, 106 may be in communication with a single relay services node 202, in an effort to not overwhelm relay services node 202, queuing of messages is left as a job for the individual host services 102, 104, 106.

As can be seen in FIG. 4, when message 300 arrives at host service 102, the host service 102 sends communication 303 to the relay services node 202. Communication 303 is an enable message which is meant to be passed on to MCD 120 by the relay services node 202. The enable message 303 is a message which serves to indicate to MCD 120 that upon generation of an event, MCD 120 can send a fetch message. Enable message 303 is one of two elements required for MCD 120 to send a fetch communication (339 for example), the other element is an event (363 for example). In a preferred embodiment, the enable message 303 is comprised of an identifier which can be used to positively identify the message M1 which is ready for retrieval. In another embodiment, the enable message 303 could contain a subset of the information contained in the message M1 itself, but not the entire message, this information could be of any length as the enable message 303 is sent using a data channel. In yet another embodiment, the enable message 303 could contain a list of message identifiers each representing a different message. Enable message 303 could alternatively contain no message identifiers, in this case enable message 303 would simply be an indication to MCD 120 that at least one message is ready for retrieval. In yet another embodiment, the enable message 303 could contain a field which indicates how many messages are pending for MCD 120 at host services 102. It is preferable that the enable message 303 arrives using the same communications channel as is used for receiving entire data messages (M1, M2).

Enable message 303 indicates to the relay services node 202 that it must send an enable message 303 (or send a new enable message on the basis of enable message 303) to MCD 120. In the example shown in FIG. 4, when communication 303 arrives at the relay services node 202, the relay services node 202 does not know the presence of MCD 120 for which enable message 303 (and by extension M1) is intended. Since the relay services node 202 does not know about MCD 120, the relay services node 202 sends failure message 306 back to the originating host service 102. Upon receipt of failure message 306, the host service 102 notes that MCD 120 is currently unavailable and places the enable message 303 for M1 in a queue to be resent when the presence of MCD 120 device becomes known. Upon receipt of communication 321, which serves to notify host service 102 that the relay services node 202 is now aware of the presence of the MCD 120, the host service 102 sends any enable messages which may be pending (or queued) for MCD 120. As a result, the enable message for message M1 is sent again in communication 324. The relay services node 202 now being aware of the presence of MCD 120, which is intended as the recipient of the enable message for M1, can direct enable message 324 for M1 (or send a new enable message) to MCD 120 in communication 327. When MCD 120 receives the enable message for M1 (in communication 327) it parses out relevant information, such as the message identifier if present, from the enable message 327 and stores the relevant information which will enable MCD 120 to retrieve the complete message M1 at a later time, as further explained below, MCD 120 also sets and stores an enable flag EF in step 369. The enable flag EF is a value, preferably a boolean value and is stored in either a cache or a data store, such as a database. When enable flag EF is set, it serves to indicate that MCD 120 has a message pending for retrieval at a host service 102.

In a similar manner, message M2 arrives at the host service 102 from an external source in communication 330, an enable message for message M2 is sent from the host service to the relay services node 202 in communication 333 and the relay services node 202 passes on the enable message 333 for message M2 to the MCD 120 in communication 336. In another embodiment, the enable message 333 could contain a list of message identifiers, upon receipt of which MCD 120 would store each of the identifiers. In yet another embodiment, the enable message 333 could contain no identifiers, upon receipt of which MCD 120 would note that it has at least one message to be retrieved from the host service 102. In yet another embodiment, the host services 102 could amalgamate a plurality of enable messages into a smaller plurality of enable messages, for example, sending one enable message to represent the arrival of two messages. In any of the preceding embodiments, MCD 120 will, upon receipt of an enable message, store any message identifiers contained in the enable message, and note that the host services 102 has at least one message which can be retrieved. In a preferred embodiment, MCD 120 notes that the host services 102 has at least one message which can be retrieved by setting a enable flag EF in the cache or data store.

In a preferred embodiment, event generator 354 generates events after the expiration of a chosen time period. It is important to note that the event generator 354 is independent from any received enable messages and that as such, events are generated independently of any received enable messages. In FIG. 4, event 357 and event 360 indicate two successive events. In a preferred embodiment, event 360 occurs one minute after event 357. In another embodiment, the events could be triggered by a user interaction, such as removal of MCD 120 from its holster, entry of a predetermined key sequence or user selection of display item, and as such might not be uniformly spaced as shown in FIG. 4. The event generator 354 resides in the MCD 120 and is preferred to be a software module adapted to execute in the MCD 120's processor.

Upon the generation of an event, MCD 120 determines if any enable messages have been received by examining enable flag EF. As noted above, the enable flag EF is stored in a cache or a data store, such as a database, and is set in step 369 as a result of receipt of enable message 327. As shown, at events 357 and 360, the MCD 120 has not yet received any enable messages, and so the MCD 120 does not carry out a fetch operation. At event 363, two enable messages have been already been received at MCD 120; enable message 327 (for M1) and enable message 336 (for M2). Upon generation of event 363, MCD 120 examines the enable flag EF to determine whether or not it has received one or more enable messages. Because the enable flag EF is set (at step 369), MCD 120 sends fetch communication 339 to the relay services node 202 at event 363. Relay services node 202 relays the fetch communication 339 to the host service 202 in communication 342. In a preferred embodiment, the fetch communication 339 (and subsequently 342) fetches any pending messages from the host service 102. In another embodiment, the fetch communication 339 (and subsequently 342) includes either a single identifier or a list of identifiers received in enable messages, and causes transmission by the host services 102 of all of the messages specified by the identifiers in the fetch communication 339 (and subsequently 342). For example, fetch communication could contain the message identifiers of M1 and M2, which when received by the host service 102 would indicate to the host service 102 that MCD 120 would like to retrieve messages M1 and M2.

Upon receiving fetch communication 339, relay services node 202 sends fetch communication 339 on to the appropriate host service 102 in communication 342. In a preferred embodiment, the host service 102 receives fetch command 342 and in response sends all relevant pending messages to MCD 120. In FIG. 4, this can be seen as communications 345 and 366, in which the entire contents of message M1 and message M2 respectively are sent to MCD 120. In another embodiment, the host service 102 would only send the messages whose identifiers were contained in fetch communication 342. In yet another embodiment, the host service 102 would only send one enable message to MCD 120 regardless of how many messages are received by the host service 102. In this scenario, the first message would trigger transmission of a single enable message and the host service 102 would not send any further enable messages until a fetch has been received. In this embodiment, MCD 120 would send a fetch command in response to the single enable message, and the host service 102 would send all pending messages to MCD 120. In yet another embodiment, host service 102 would open a time frame, or window, upon receipt of a fetch message from MCD 120. While the time frame is open, the host service 102 would send any messages received for MCD 120 to MCD 120 without the need for any subsequent enable message or fetch message. The duration of the time frame or window could be configurable and could for example be 10 seconds or 1 minute. Once the duration of the time frame has expired, or the window has been closed, the host service 102 ceases sending messages received for MCD 120 to MCD 120 without the use of enable messages and fetch commands as described in FIG. 4. The expiration of the time frame or closing of the windows implies that host service 102 needs to send enable messages to MCD 120 for messages subsequently received and intended for MCD 120 and MCD 120 will need to request delivery of the subsequently received messages through the use of a fetch command.

In another embodiment, the message delivery session described in FIG. 4, or a portion thereof, occurs during a logged in session. A logged in session is a period of time during which MCD 120 can send and receive email messages, to and from host service 102. When MCD 120 is not in a logged in a session, MCD 120 is unable to send or receive email messages but could receive enable messages. A logged in session is commenced by a user of MCD 120 providing logon credentials (login name and password for example), or by a user of MCD 120 executing predefined commands, such as commencement of a messaging application or entry of a key sequence. In this particular example, upon commencement of a logged in session, MCD 120 may send a fetch communication (339 for example). While MCD 120 is outside of a logged in session, MCD 120 can receive enable messages (327 or 336 for example) but will not generate a fetch communication (339 for example) until commencement of a logged in session. While MCD 120 is outside of a logged in session, it is probable that a user of MCD 120 is not currently using MCD 120 and does not require receipt of their email messages. As a result of sending a fetch communication (339 for example) for every received enable message (327 for example) wastes battery life, so MCD 120 will not send a fetch communication (339 for example) until a user commences a logged in session, retrieving all pending email messages from host services 102. A fetch communication (339 for example) could be generated automatically upon commencement of a logged in session or alternatively could be generated by the user manually, or at routine intervals, during the logged in session.

In this example, a logged in session ends after the expiry of a period of time of user inactivity and is controlled by relay services node 202. The logged in session can be extended by a user of MCD 120 in a variety of ways, for example, if a user of MCD 120 is continuously using MCD 120's messaging application the duration of the logged in session is continuously reset, allowing for a user of MCD 120 to maintain a logged in session as long as they are using MCD 120's messaging application. If a user of MCD 120 ceases to use MCD 120's messaging application, the logged in session's duration will start to be counted down, when the duration remaining is approaching zero, MCD 120 notifies a user of MCD 120 that the logged in session is nearing completion, giving a user the opportunity to extend the logged in session. The notification could be MCD 120 vibrating or producing another audible indication to a user, or any similar notification such as a message box on the screen of MCD 120. Upon receipt of the notification, MCD 120's user can extend the logged in session's duration by accepting the message box for example.

One skilled in the art should appreciate that the various databases and service logic processing set forth above with respect to the wireless communications system may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

What is claimed is:

1. A method in a mobile communications device operative in a wireless communication network for receiving data messages from a host service, the method comprising:
   detecting, by the mobile communication device, an event which occurs at the mobile communications device;
   in response to detecting the event, examining by the mobile communication device whether an enable flag is set in memory of the mobile communication device, the enable flag being set in response to an enable message being received at the mobile communication device via the wireless communication network, the enable message indicating that at least one data message for the mobile communications device is ready for retrieval from the host service, the event is being independent from the receipt of the enable message;
   in response to detecting the event and identifying from the examining step that the enable flag is set in the memory:
      requesting the at least one data message by sending via the wireless communication network a fetch message;
      in response to sending the fetch message, receiving via the wireless communication network the at least one data message from the host service; and
   in response to detecting the event and identifying from the examining step that the enable flag is not set in the memory, refraining from sending the fetch message.

2. The method of claim 1 wherein the at least one data message is an email message.

3. The method of claim 1 further comprising the step of receiving the at least one data message over the communication channel.

4. The method of claim 1 wherein the step of detecting said event comprises detecting user interaction with respect to any one of all of a plurality of keys of the mobile communications device.

5. The method of claim 1 further comprising:
setting the enable flag in response to receiving the enable message.

6. The method of claim 1 wherein said enable message comprises a short message service message.

7. The method of claim 1 wherein said enable message is received from an email management engine and wherein said fetch message is sent to the email management engine.

8. The method of claim 1 wherein said event is a device generated event which is generated independently from any user interaction at the mobile communications device.

9. The method of claim 8 wherein the user generated event is one of entering an email service, rolling an input wheel, and entering a keystroke at the mobile communications device.

10. The method of claim 8 wherein the device generated event is one of expiry of a timer.

11. The method of claim 1 wherein said event is different from a user input request for the at least one data message.

12. The method of claim 11 wherein said event is removal of the mobile communications device from a holster.

13. The method of claim 1 wherein said enable message comprises at least one identifier of the at least one data message.

14. The method of claim 1, further comprising:
receiving a plurality of data messages in response to the requesting.

15. The method of claim 1 wherein the steps of detecting and requesting are executed during a logged in session.

16. A mobile communications device operative in a wireless communication network and configured to receive data messages from a host service via the wireless communication network, the mobile communications device comprising:
a communication module configured to receive an enable message transmitted over a communication channel of the wireless communication network, the enable message being indicative that at least one data message for the mobile communication device is ready for retrieval from the host service;
an event detector configured to detect an event which occurs at the mobile communication device independent from the receipt of the enable message;
an examining module configured to examine, in response to the event being detected in the event detector, whether an enable flag is set in memory of the mobile communication device, the enable flag being set in response to the enable message being received in the communication module;
the communications module being further configured to send via the wireless communication network a fetch message in response to the event being detected in the event detector and the enable flag being identified in the examining module as being set, and being further configured to receive via the wireless communication network the at least one data message from the host service in response to sending the fetch message; and
the communication module being further configured to refrain from sending the fetch message in response to the event being detected in the event detector and the enable flag being identified in the examining module as not being set.

17. The mobile communications device of claim 16 wherein said event generator is further adapted to generate said event that is different from a user input request to retrieve the at least one data message.

18. The mobile communications device of claim 16 which is configured to set the enable flag in response to receiving the at least one data message.

19. The mobile communications device of claim 18 wherein the at least one data message is an email message.

20. The mobile communications device of claim 16 wherein the event detector is further adapted to detect user interaction with respect to any one of all of a plurality of keys of the mobile communications device.

21. The mobile communications device of claim 20 wherein said enable message includes a message identifier.

22. The mobile communications device of claim 16 wherein the receiving comprises receiving a plurality of data messages.

23. The mobile communications device of claim 16 wherein the generated event is one of entering an email service, rolling an input wheel, and entering a keystroke.

* * * * *